(No Model.)
C. E. ROBERTS.
BALL BEARING FOR CARRIAGES.
No. 581,772.  Patented May 4, 1897.
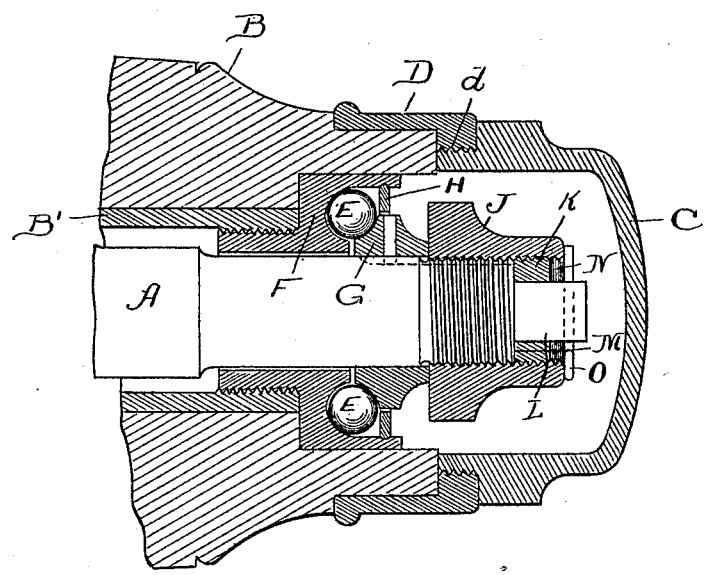
WITNESSES:
INVENTOR:
CHARLES E. ROBERTS
BY Munday, Evarts & Adcock.
HIS ATTORNEYS.

United States Patent Office.

CHARLES E. ROBERTS, OF OAK PARK, ILLINOIS.

BALL-BEARING FOR CARRIAGES.

SPECIFICATION forming part of Letters Patent No. 581,772, dated May 4, 1897.

Application filed June 4, 1896. Serial No. 594,252. (No model.)

*To all whom it may concern:*

Be it known that I, CHARLES E. ROBERTS, a citizen of the United States, residing at Oak Park, in the county of Cook and State of Illinois, have invented a new and useful Improvement in Ball-Bearings for Carriages, &c., of which the following is a specification.

This invention relates to improvements in ball-bearings for the wheels of carriages and other vehicles; and its nature will be fully understood from the subjoined description and the accompanying drawing, in which I show a longitudinal section of a portion of a bearing embodying my invention.

In said drawing, A represents the axle-spindle; B, the hub of the wheel; B', the box; C, the dust-cap, and D the hub-band, to which the cap is threaded.

E E are the balls; F, the cup threaded into the box or otherwise attached thereto; G, the cone, and H the ball-retaining ring rigidly secured to the outer end of the cup. The cone is reversible—that is to say, it has two acting-faces, either of which can be used, and when one is worn out the cone can be turned around and the other face put into use, so that its life of usefulness is double that of a single-face cone.

Another purpose had in view in making the cone double-faced is this: Instances have come to my notice where the cone has, through carelessness or lack of knowledge, been put on with its bearing-face away from instead of toward the balls, and the result has been serious injury to the bearing. With a double-faced cone, however, there is no possibility of any such error.

After the cone has been positioned the nut J is screwed down upon the threaded end of the spindle until it touches the cone and produces the necessary closeness of contact by it with the balls. The hollow and exteriorly-threaded stop-nut K, whose interior fits the reduced and extended end L of the axle-spindle and whose thread fits the thread of nut J, is then turned in nut J until it bears against the shoulder M of the spindle, so that a limit is established to further inward movement of said nut J, and the correct positioning of nut J is insured whenever it is replaced after being removed for any purpose. The stop-nut is turned by means of an appropriate tool having prongs adapted to enter the recesses or slots N upon opposite sides of the nut.

To prevent the nuts J and K from loosening or unscrewing, a cotter O or other retaining pin or device is passed through or secured upon the outer end of the axle extension L.

The dust-cap is held in place by means of a threaded engagement with the overhanging portion *d* of the hub-band. In this manner it is not only securely held, but a dust and dirt proof joint is effected, and the hub is caused to present a very finished and neat appearance.

I claim—

1. The combination with the adjustable cone of the adjusting and holding nut threaded upon the axle, the stop-nut threaded in said adjusting-nut, the axle having its end extended through both said nuts, and a retaining device or pin, substantially as specified.

2. The combination with the adjustable cone of the adjusting and holding nut threaded upon the axle, the stop-nut in said adjusting-nut, and the threaded axle having the reduced and extended end entering the stop-nut, substantially as specified.

CHARLES E. ROBERTS.

Witnesses:
   EDW. S. EVARTS,
   H. M. MUNDAY.